June 27, 1933. F. C. PICKARD ET AL 1,915,950
STOKER CONVEYER
Filed June 18, 1930 3 Sheets-Sheet 2

INVENTORS
Frank C. Pickard
Howard P. Anderson
BY
E. Archer Turner
ATTORNEY

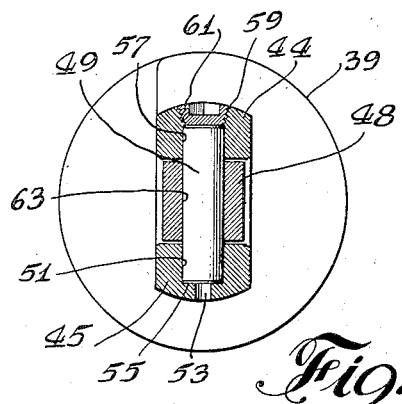
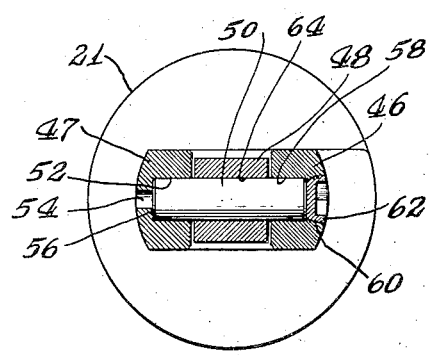
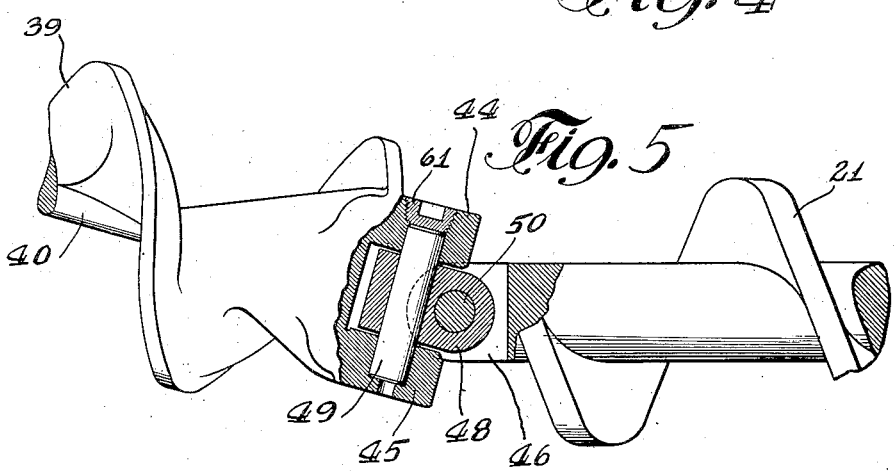
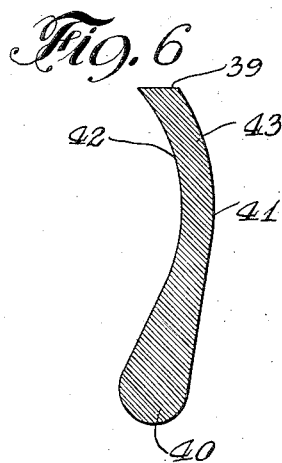
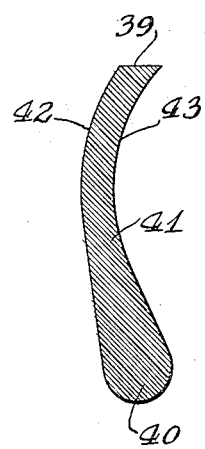
INVENTORS
Frank C. Pickard
BY Howard P. Anderson
ATTORNEY Patented June 27, 1933

1,915,950

UNITED STATES PATENT OFFICE

FRANK C. PICKARD AND HOWARD P. ANDERSON, OF ERIE, PENNSYLVANIA, ASSIGNORS TO THE STANDARD STOKER COMPANY, INCORPORATED, A CORPORATION OF DELAWARE

STOKER CONVEYER

Application filed June 18, 1930. Serial No. 461,953.

This invention relates to mechanical stokers; and especially to locomotive stokers wherein a helical screw conveyer is employed to carry fuel forward from the tender to the locomotive, particularly, of the character disclosed by the drawings of the patent to E. Archer Turner, No. 1,711,466, granted April 30, 1929.

It is a general object of this invention to provide, in a stoking apparatus of the class mentioned, new and improved features of construction for effecting free and loose passage of the fuel from the tender to the locomotive with a further reduction of pulverization and grinding.

More particularly, it is an object of this invention to provide a helical screw conveyer of a new and improved construction imparting a centripetal movement to the fuel conveyed, whereby grinding of the fuel against the sidewalls of the screw housing is eliminated, and the wear on the screw flight takes place mainly at its thickened inner portion.

It is another object of this invention to provide a helical conveyer screw in which the impelling faces of the screw flights are concave except the last half turn of the screw flight which is formed with a convex impelling face.

A further object is the provision in a jointed fuel conveying mechanism of a new and improved universal joint having no protruding parts which tend to grind the fuel.

With these and other objects in view, which will become apparent as the description proceeds, the invention resides in the construction, combination and arrangement of parts, hereinafter more fully described and claimed, and illustrated in the accompanying drawings, in which Fig. 1 is a vertical longitudinal section of the locomotive and its tender, and of the stoker;

Fig. 3 is a vertical section on the line 3—3 of Fig. 1;

Fig. 4 is a vertical section on the line 4—4 of Fig. 2;

Fig. 5 is an enlarged view of a portion of the conveyer screws with the joint arrangement shown in vertical section;

Fig. 6 is a section on the line 6—6 of Fig. 1; and

Fig. 7 is a section on the line 7—7 of Fig. 1.

Figure 1:
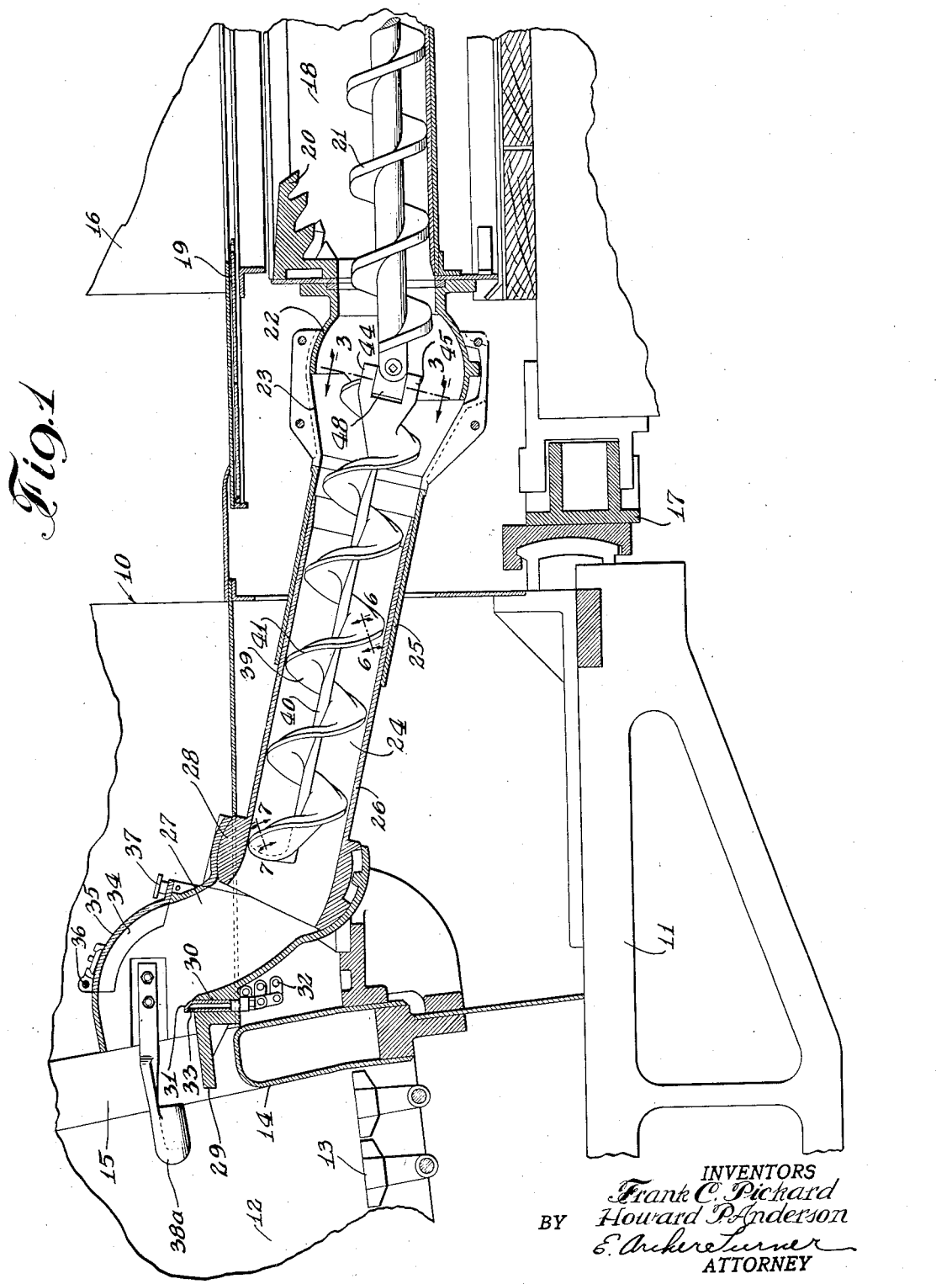
Figure 2:
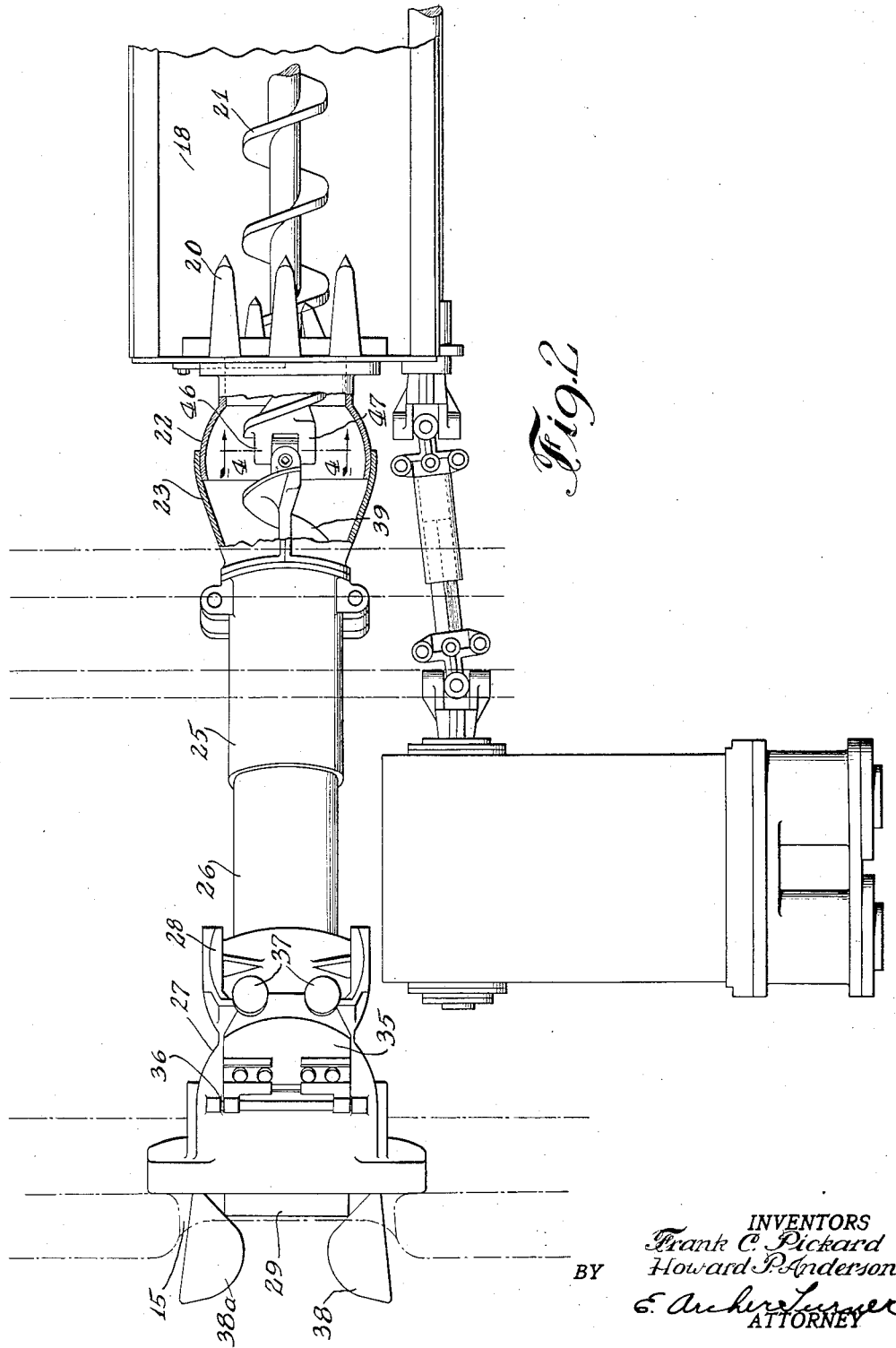
Fig. 2 is a plan view of Fig. 1 with parts broken away.

In the drawings, the locomotive is generally represented at 10, and its frame at 11. A boiler firebox of conventional design is designated at 12 and is provided with the grate 13, and the backhead 14 with a firing opening 15 therethrough. Portions of the tender are shown at 16, and the coupling uniting the locomotive and tender at 17.

The fuel conveying mechanism comprises a transfer conduit 18 adapted to be fixedly secured to the tender below the floor 19 thereof, which is suitably apertured to permit the coal carried in the fuel bin to be discharged into the conduit. A crushing jaw 20 is shown as arching over the forward end of the conduit 18. Within this conduit there is mounted a helical screw 21 for advancing the fuel.

At the forward end of the conduit 18 is located one section of a hollow ball joint 22, the other section 23 thereof being carried by one part of a conduit 24 which conveys the fuel to the point of delivery into the firebox. The conduit 24 comprises the section 25 which carries the ball joint section 23 and the section 26, the two sections 25, 26 being in telescopic engagement and adapted to freely slide, the one within the other.

The forward end of the section 26 is flexibly jointed with the delivery nozzle 27 through the ball and socket connection 28. The delivery nozzle 27 communicates with the lower portion of the firing opening 15 of the backhead 14 and delivers the fuel upon a distributor table 29 detachably connected to the upstanding wall 30 of the delivery nozzle 27 and terminates in the firing opening 15 at its forward end. Rearwardly of the table 29 and outside of the firebox is a vertically disposed distributor head 31 to which pressure fluid such as steam is supplied by a desired number of supply pipes 32. The distributor head 31 is provided with openings or jets 33 for emitting a blast of fluid across the table 29. The delivery nozzle 27 is provided with an opening 34 through which access may be had to the interior of the nozzle. A closure 35 is provided for the opening 34. It is preferably though not necessarily hinged at its upper end as at 36 and a latch 37 holds the same in closed position.

A pair of deflector members 38, 38a disposed above the table 29 are provided in order to obtain an even distribution of fuel over the firebed and to feed fuel to the rear corners of the firebox. It will be obvious however, that any suitable distributor may be used for distributing fuel over the firebox in place of the table and top deflectors shown as our preferred embodiment.

Disposed within the conduit section 24 is the novel screw 39 terminating near the forward end of the conduit 24. The screw 39 urged the fuel forwardly and upwardly through the delivery nozzle 27 onto the table 29 and into the path of the pressure fluid blast issuing from the jets 33.

The screw 39 as shown in Figs. 1, 6 and 7 comprises a relatively small hub 40 constituting the thickened radial inner edge of the screw flight 41. The impelling or forward face 42 of the screw flight 41 is concave and its opposite surface or rearward surface 43 is convex. The last half turn of the screw flight 41 at the forward end of the screw 39 is formed with a convex impelling face and a concave rearward surface.

It has been customary heretofore to construct such helical conveyer members with flights having a flat impelling face and with a radial section either uniform in thickness all the way from its radially inner to its outer edges, or gradually tapering in thickness from a maximum adjacent to the hub to a minimum thickness at its periphery. When such a conveyer member is used with its axis in an inclined position for advancing fuel forwardly and upwardly through a conduit, the fuel is pressed against the sidewalls causing a breaking down and grinding of the lump fuel producing pulverulent material; also the fuel exerts an abrasive action which is greater at the radially outer portion of the screw flight than in those portions radially inward thereof, because of the centrifugal movement of the fuel causing most of the fuel to contact and be advanced by the radially outer portion of the screw flight.

This pulverizing of the fuel is eliminated and such abrasive wear is greatly reduced in the use of our novel screw conveyer. The screw flight 41 because of its concave impelling face produces a centripetal movement of the fuel away from the screw housing or conduit sidewalls, thus, eliminating pressure of the fuel against the side walls and eliminating pulverization of the fuel. This is considered an important feature of our invention. Furthermore, the centripetal movement imparted to the fuel materially reduces the abrasive action against the sidewalls of the conveyer conduit and spreads the wear more uniformly across the screw flight with the greater amount of wear occurring at the inner or thickened hub portion 40 of the screw. The latter is particularly true when the angle of inclination of the screw more nearly approaches a perpendicular position. The use of our new screw construction will increase the life of the conveyer conduit as well as the screw itself, thereby reducing maintenance costs, while at the same time, providing a rigid and durable structure so necessary in advancing fuel from the tender to the locomotive.

The convex forward flight of the screw 39 exerts an upward thrust on the fuel and assists in lifting or advancing the fuel through the delivery nozzle 27. It has been found that a helicoid screw having a forward concave or flat flight when rotated in a right hand direction has a tendency to deliver most of its charge to the left side of its center line and when rotated in a left hand direction to the right side of its center line. With our improved screw construction fuel is delivered in a substantially uniform stream. This construction permits of equal firing to both sides of the firebox without the use of means for regulating the flow of fuel to the firing table or distributor plate. A further advantage of the convex forward flight is that it eliminates the knife edge action on the fuel as it exerts its forward thrust on the fuel stream thereby considerably reducing grinding and breaking down of the fuel.

It has been usual in the construction of screw conveyers to make the flights adjacent the universal connection of a greater diameter than the remainder of the screw flights. This has been done because the conveying conduit has a larger diameter at the point formed by the sections 22 and 23 of the ball joint and it was thought desirable to prevent the accumulation of fuel in this widened portion. We have found however, that increasing the diameter of the flights in this widened portion of the conveying conduit causes a churning of the fuel, and breaking down of the fuel necessarily results. We have discovered that fuel is conveyed with less grinding and breaking down if the screw flights are of uniform diameter throughout adjacent the joint construction. In such a construction, the lower side of the pocket formed by the ball joint sections 22 and 23 is filled with fuel and forms a floor over which the fuel is continuously advanced by the screw flights, eliminating the churning of fuel and the consequent grinding and breaking down.

The rearward end of the screw 39 is formed with an enlarged hub which is bifurcated or forked providing the tongues 44, 45 and the forward end of the screw 21 is likewise bifurcated or forked providing the tongues 46, 47, situated at right angles to the tongues 44, 45 and being interfitted therewith, but separated sufficiently to allow for the maximum universal movement.

The tongues 44, 45 and 46, 47 are united for relative universal movement by a suitable coupling member such as the block 48 and the studs 49 and 50. The tongues 45 and 47 are provided with the inner bores 51 and 52 and the outer bores 53 and 54 of lesser diameter providing the seats 55 and 56 for the studs 49 and 50 respectively. The tongues 44 and 46 are provided with the inner bores 57 and 58 diametrically opposite the bores 51 and 52 respectively, and the tapped openings 59 and 60 for receiving the threaded plugs 61 and 62 respectively, which hold the studs 49 and 50 in place. The block 48 is provided with the bores 63 and 64 at right angles to each other, the bore 63 registering with the bores 51 and 57 and the bore 64 registering with the bores 52 and 58. This construction provides a joint allowing maximum universal movement and having no protruding bolts and nuts which tend to grind and break down the fuel.

It will be apparent that our invention is applicable not only to the class of stoker specified, but that it can also be embodied for use with other classes of stokers or conveyer and elevating systems to equally good advantages.

We claim:

1. A conveyer screw adapted to be rotatably disposed in a fuel conduit for advancing fuel therein having only the last half turn of its flight at the forward end formed with a convex impelling face.

2. A conveyer screw adapted to be rotatably disposed in a fuel conduit for advancing fuel therein, having a portion of the last turn of its flight at the forward end formed with a convex impelling face and the remainder of the flight formed with a concave impelling face.

3. A conveyer screw adapted to be rotatably disposed in a fuel conduit for advancing fuel therein, having a portion of the last turn of its flight at the forward end formed with a convex impelling face and the remainder of the flight formed with a concave impelling face, said flight being thicker at its radially inner portion than at its radially outer portion, said thickened portion forming a relatively small hub for said conveyer screw.

4. A conveyer screw adapted to be rotatably disposed in a fuel conduit for advancing fuel therein having the last half turn of its flight at its forward end formed with a convex impelling face and the remainder of the flight formed with a concave impelling face.

5. A conveyer screw adapted to be rotatably disposed in a fuel conduit for advancing fuel therein, having a portion of the last turn of its flight at its forward end formed with a convex impelling face and the remainder of the flight formed with a concave impelling face, the flight having a substantially uniform diameter throughout its length.

6. A conveyer screw adapted to be rotatably disposed in a fuel conduit for advancing fuel therein, having a flight of uniform diameter, a portion of the last turn of said flight at one end of said screw being formed with a convex impelling face and the remainder of the flight being formed with a concave impelling face, a relatively small hub for said screw, the end thereof opposite said convex screw flight portion being enlarged and formed with a bifurcated jaw.

7. In combination, a conveying system including a conveyer conduit section, said section comprising a straight rearward conduit portion and a forward upturned conduit mouth member, a helicoid screw mounted to rotate in said straight rearward conduit portion and at its forward end terminating adjacent the lower portion of said upturned member, said screw having a single continuous flight throughout its length and having only its last half turn at its forward end formed with a convex impelling face.

8. In combination, a conveying system including a conveyer conduit section, said section comprising a straight rearward conduit portion of circular cross section and a forward upturned conduit mouth member, a helicoid screw mounted to rotate in said straight rearward portion and at its forward end terminating adjacent the lower portion of said upturned member, said screw having a single continuous flight of uniform diameter throughout its length and having a portion of the last turn of said flight at its forward end formed with a convex impelling face and the remainder of said flight formed with a concave impelling face.

9. In combination, a conveyer conduit section, said section terminating at its delivery end in a flaring mouth portion, and a screw conveyer mounted to rotate in said conduit and at one end terminating adjacent said mouth portion short of the delivery end of said conduit, said screw having only the last half turn of its flight at the end thereof adjacent said mouth portion formed with a convex impelling face.

In testimony whereof we affix our signatures.

F. C. PICKARD.
HOWARD P. ANDERSON.